March 29, 1949.	G. W. WOODS	2,465,503
WELDING ELECTRODE
Filed Oct. 8, 1947

INVENTOR.
GORHAM W. WOODS
BY
Oberlin + Limbach
ATTORNEYS.

Patented Mar. 29, 1949

2,465,503

UNITED STATES PATENT OFFICE 2,465,503

WELDING ELECTRODE

Gorham W. Woods, Cleveland, Ohio, assignor to The Lincoln Electric Company, Cleveland, Ohio, a corporation of Ohio Application October 8, 1947, Serial No. 778,639

3 Claims. (Cl. 219—8)

This invention relates as indicated to welding electrodes and more particularly to arc welding electrodes of generally tubular form which may for example contain comminuted alloying ingredients therein adapted to produce a wear resisting alloy or the like as taught in application Serial No. 737,524 of Gorham W. Woods and Paul E. Jerabek filed March 27, 1947.

It is generally preferred that a weld rod of this type be coated with an appropriate flux to obtain best results in welding. It is also preferred that the layer of flux be distributed over substantially the entire outer surface of the weld rod. This requirement has raised a problem when it is desired to employ such flux coated electrodes for automatic electric arc welding since it is necessary to obtain a good low resistance electrical contact with the electrode not far from the arc. The typical fluxes are, of course, non-conductive. Various attempts at solving this problem as it concerns the usual weld rod are illustrated in Patents Nos. 1,797,289 and 1,789,656 to Kotchi who incorporates a flux in slots or grooves in his weld rod. Patents Nos. 1,835,899 and 1,835,900 to Rode show another approach to the problem wherein the flux is carried in a large number of small cavities in the outer surface of the electrode.

The following are the chief methods employed by prior workers in the art in attempting to overcome the problem with which this invention is concerned:

1. The flux coating on the weld rod may be cut away in a narrow strip longitudinally of the rod to permit the making of continuous electrical contact with the underlying metal.

2. A helix of small wire may be wrapped around the metal electrode and the electrode coated with a layer of flux substantially flush with such wire helix.

3. The weld rod may be grooved or nicked and such grooves or nicks filled with the coating material.

4. A bare nicked wire may be passed through the electric contactors immediately after which a tape impregnated with the coating material is folded around the wire as it advances toward the arc.

5. A thin metal outer sheath may be pressed around the flux coated wire and electrical contact made with such sheath.

6. A bare wire may be employed and the flux material placed on the work in advance of the arc.

The chief difficulties encountered with such prior art methods have been lack of complete arc protection, unreliability of the electrical contact with the welding electrode, and relatively high cost. It is therefore a primary object of my invention to provide an arc welding electrode of novel type which although coated with a layer of flux will afford good and continuous electrical contact when employed in automatic arc welding, for example.

Another object of my invention is to provide such electrode which is at the same time particularly adapted to the production and deposition of hard and abrasion resisting alloys, such as manganese steel, high-speed steel, stainless steel, and certain of the non-ferrous materials and alloys.

Still another object is to provide such electrode which is adapted to continuous, rapid, and relatively inexpensive manufacture.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
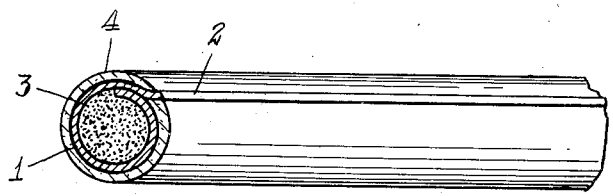
Fig. 1 illustrates one form of tubular electrode in accordance with my invention.

Referring now more particularly to such drawing and especially Fig. 1 thereof, the electrode there illustrated is of tubular construction and may for example be formed of thin steel strip 1. The edges of such tubularly formed strip, instead of abutting, overlap and one of such edges 2 may be turned outwardly to project from the side of the tube thus formed, forming a continuous longitudinal rib. The interior of such tubular electrode may for example be filled with granulated or comminuted alloy ingredients 3 which, when interfused with the metal of the tubular container in the welding arc, will produce the desired alloy. An outer layer of flux 4 will be applied to the electrode of a thickness permitting rib 2 to protrude therethrough and thereby provide perfect and continuous electrical contact as the electrode is continuously fed through the automatic electric arc welding machine.

Figure 2:
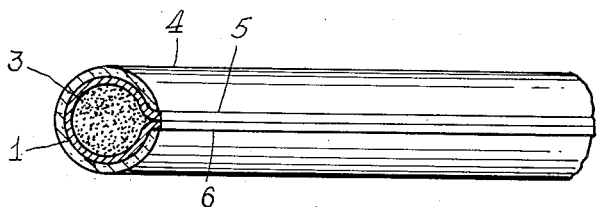
Fig. 2 illustrates another embodiment of my invention.
Figure 3:
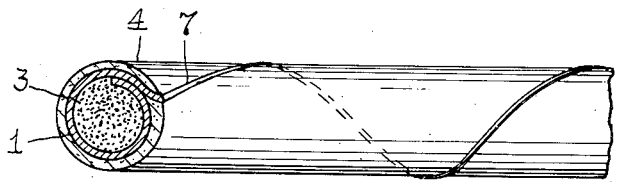
Fig. 3 shows an electrode in accordance with my invention in which the tubular member is of twisted construction.

The embodiment of my invention illustrated in Fig. 2 is generally similar to that above described, except that the two opposed edges 5 and 6 of the tube instead of overlapping are both pinched together and turned outwardly to provide a continuous longitudinal rib of twice the lateral dimension of rib 2.

In cases where the flux coating is of a type which does not adhere any too well to the metal surface of the tubular electrode, it is sometimes advantageous to form such electrode in the general manner shown in Fig. 1 but twisted so that protruding edge 7 of the metal strip forms a helical rib around such electrode which assists in retaining the flux coating. The outer surface of the tube may of course also be knurled, nicked or grooved, if desired, to additionally assist in anchoring the flux coating.

Figure 4:
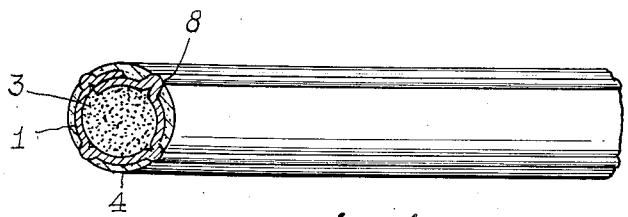
Fig. 4 shows another embodiment in which a plurality of ribs protrude through the flux coating.
Figure 5:
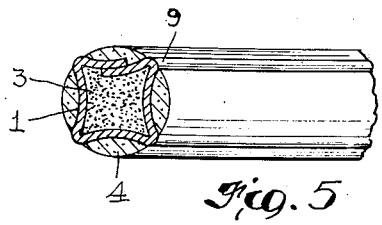
Fig. 5 illustrates another form generally similar to that of Fig. 4, but providing for a thicker outer coating.

A greater area for electrical contact may be provided as well as greater assurance that such contact will not be interrupted by forming my new electrode in the manner illustrated in Figs. 4 and 5. In these forms the opposed edges of metal strip forming the tube need not be turned outwardly, but the wall of the tube may be pinched to provide a plurality of longitudinal outwardly protruding ribs such as 8 and 9. The flux coating is, of course, applied to a depth permitting the outer edges of such ribs to remain uncovered. Such layer of flux may be substantially flush with the outer edges of such ribs, or the ribs may desirably be permitted to protrude slightly therefrom. Where the walls of the tube are concave between the ribs as shown in Fig. 5, it is obvious that a larger proportion of flux may be adhered thereto than in the case where such walls are convex as shown in Fig. 4. If the flux is of a type which does not normally adhere very satisfactorily, there is an advantage in employing a tubular electrode, the wall portions of which are concave as shown in Fig. 5.

While electrodes produced in accordance with my invention may be employed for a variety of purposes, it is particularly contemplated that such electrodes will be employed for the deposition of hard surfacing alloys and the like. The tubular conductor element will ordinarily have relatively thin walls and be formed of a mild steel. The alloy ingredients may be in finely powdered or comminuted form, but granular material capable of passing 40 mesh screen is ordinarily quite satisfactory.

Instead of alloying ingredients of the like, a flux material may be placed within such tubular electrode and such flux material may be either in the form of a solid core or in granular form. Or, if so desired, a proportion of flux may be included with such alloying or other ingredients within the tube.

It will of course be understood that the term "flux" as used herein and in the claims is intended to include all types of materials commonly so designated in the art, such as for example, the slag forming materials selected to react with certain materials in the weld metal, materials which will form a slag covering effective to prevent oxidation of the weld metal, and the slag forming materials which are effective to retard cooling of the weld to provide a smooth weld surface. Also included are "flux" coatings, such as those which are effective to provide a conductive gaseous medium at the arc to stabilize the same and prevent interruption when using alternating current. In fact, it will be understood that such term includes any of the generally nonconductive coating materials applied to arc welding electrodes.

The arc welding electrode above described is capable of very rapid and inexpensive manufacture and affords both improved electrical contact and flux coating retention.

Other modes of applying the principle of the invention may be employed, change being made as regards the details described, provided the features stated in any of the following claims or the equivalent of such be employed.

I therefore particularly point out and distinctly claim as my invention:

1. An arc welding electrode comprising an elongated metal tube formed of generally circularized mild steel strip having overlapping edges, the outer of said edges being turned outwardly to form a continuous integral rib extending longitudinally of the outer surface of said tube, comminuted alloying ingredients contained within said tube, and an outer coating of flux on said tube leaving said rib exposed.

2. An arc welding electrode comprising an elongated metal tube formed of twisted metal strip having overlapping edges, the outer of said edges being turned outwardly to form a continuous integral spiral rib extending along the outer surface of said tube, and an outer coating of flux on said tube leaving said rib exposed.

3. An arc welding electrode comprising an elongated metal tube formed of generally circularized metal strip having inner and outer overlapping edges, the outer of said edges being turned outwardly to form a continuous integral rib extending longitudinally of the outer surface of said tube, and an outer coating of flux on said tube leaving said rib exposed.

GORHAM W. WOODS.

REFERENCES CITED

The following references are of record in the file of this patent:

UNITED STATES PATENTS

| Number | Name | Date |
|---|---|---|
| 1,629,748 | Stoody | May 24, 1927 |
| 2,050,271 | Candy | Aug. 11, 1936 |
| 2,067,206 | Ross | Jan. 12, 1937 |